R. L. SHEWARD.
FISH HOOK.
APPLICATION FILED MAY 29, 1907.
918,206.
Patented Apr. 13, 1909.
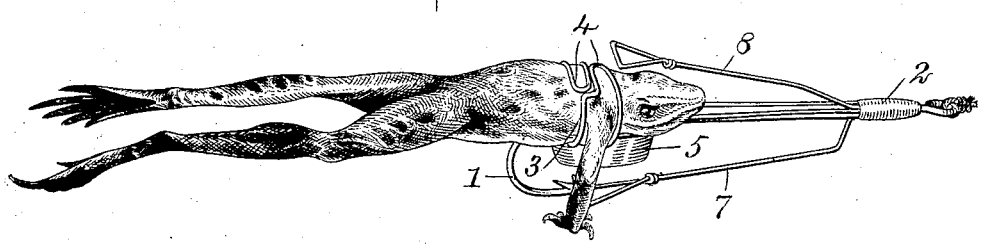
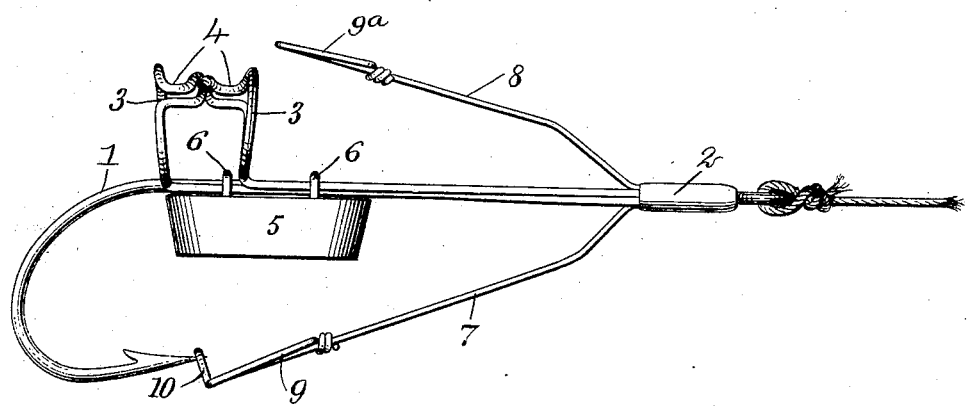
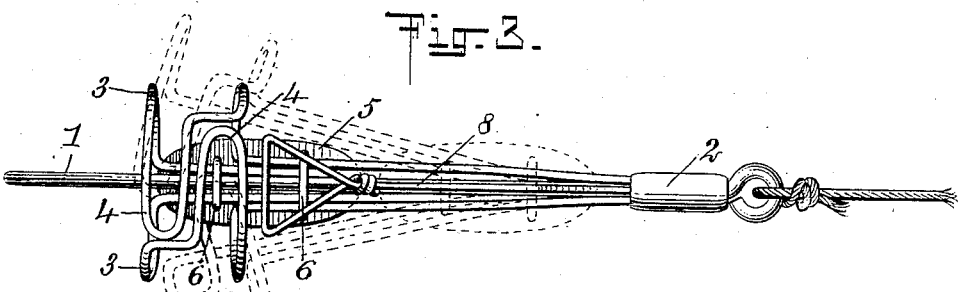
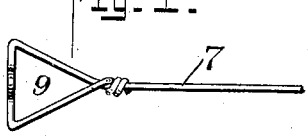
WITNESSES
INVENTOR
Ralph L. Sheward
BY Munn & Co.
ATTORNEYS

UNITED STATES PATENT OFFICE.

RALPH LEE SHEWARD, OF COUNCIL BLUFFS, IOWA.

FISH-HOOK.

No. 918,206.  Specification of Letters Patent.  Patented April 13, 1909.

Application filed May 29, 1907. Serial No. 376,231.

*To all whom it may concern:*

Be it known that I, RALPH LEE SHEWARD, a citizen of the United States, and a resident of Council Bluffs, in the county of Pottawattamie and State of Iowa, have invented a new and Improved Fish-Hook, of which the following is a full, clear, and exact description.

This invention is an improvement in fishing hooks, more especially designed for holding live frogs, and its object, primarily, is to provide a device of this character which, while operating to securely hold the frog against displacement, will not impale or otherwise injure it, whereby the frog will appear natural in the water and will remain alive and fit for bait a comparatively long time.

A further object of the invention is the provision of a weed-guard, serving not only to avoid the gathering of moss, weeds, etc. by the hook, but also preventing injury to the bait.

Reference is to be had to the accompanying drawings forming a part of this specification, in which similar characters of reference indicate corresponding parts in all the figures.

Figure 1 is a perspective view of the preferred form of my invention showing the manner in which the frog is held on the hook; Fig. 2 is a side view of the same with the frog removed; Fig. 3 is a plan of the invention showing the clamping jaws in full lines drawn together and in dotted outline when expanded, and Fig. 4 is a view of the front weed-guard.

In carrying out my invention, I employ an ordinary form of fishing hook 1, to which I affix near the eye of the shank, by a solder or other joint 2, the means for holding a frog or like bait in place, said means consisting of a double strand of strong, spring wire arranged at each side of the shank, which is bent into the form of an irregular loop 3, providing opposed clamping jaws substantially opposite the point of the hook. The loops 3 forming the clamping jaws are as shown, curved to the rear of the shank and are provided with reduced extended portions 4 which are arranged side by side and in effect, intermeshing with each other.

For forcing the clamping jaws together and expanding them is preferably provided a flat weight 5, to the face of which are affixed keepers 6, the upper keeper embracing the shank of the hook and both strands of the clamping jaw wire at each side thereof, and the lower keeper embracing the shank of the hook and the contiguous strands of wire, as clearly shown in Fig. 3. By this construction, it is apparent in sliding the weight back and forth, the clamping jaws are caused to separate and approach each other, the same being forced tightly together when the weight is drawn down on the hook.

In connection with the hook and clamping means for retaining the bait, I provide weed-guards 7 and 8, which are respectively located at the front and rear of the hook and are made of spring wire, with the upper ends embedded in the joint 2. Both guards 7 and 8 are constructed with a triangular or other equivalent form of enlargement 9 and $9^a$, respectively, by bending the wire as illustrated, the enlargement 9 being formed with a V-shaped projection 10 at the base of the triangle which is at substantially right angles thereto, as shown in Fig. 2, and designed to engage with the point of the hook.

The frog or other like bait is placed between the clamping jaws in the manner indicated in Fig. 1, the loops receiving its fore legs which pass to the point of the hook, the extensions 4 of the loops serving to embrace the frog across the back and the weight 5 being positioned directly thereunder between the legs of the frog passing through the loops, said weight operating not only to lock the clamping jaws securely together in embrace with the frog, but also performing the additional office of keeping the frog right side up in the water. With the frog thus held, the guard 7 is engaged with the point of the hook and will operate to prevent the collection of moss, weeds, etc. by the point of the hook even although it may be accidentally disengaged, and the guard 8 is located directly over the frog's head, acting to prevent weeds, etc. from catching under the frog's nose or chin, and thereby breaking its neck, which would make it unfit for bait.

The invention as shown and described, while being the preferred form of construction, is nevertheless susceptible of numerous modifications falling within the scope of the claims annexed.

Having thus described my invention I claim as new and desire to secure by Letters Patent:

1. In combination with a fish hook, of clamping jaws for embracing a frog or the like to clamp the same to the back of the hook, said jaws being adapted to engage a frog on opposite sides of its fore legs.

2. In combination with a fish hook, clamping jaws for embracing the body of a frog or the like, having openings for the reception of the fore legs of the frog.

3. In combination with a fish hook, wire clamping jaws having reduced extended portions arranged side by side adapted to embrace the body of a frog or the like.

4. In combination with a fish hook, clamping jaws consisting of wire loops for embracing the body of a frog or the like, and a weight having keepers slidable on the shank of the hook for moving said jaws to and from each other.

5. In combination with a fish hook, of means for securing a frog or the like thereto, comprising a double strand of spring wire arranged on each side of the shank of the hook and terminating in a loop having a reduced extension, the loops forming clamping jaws with their extensions lying side by side.

6. In combination with a fish hook, of means for securing a frog or the like thereto, comprising a double strand of wire arranged at each side of the shank of the hook and terminating in a loop, the loops forming clamping jaws, and a weight having alined keepers, one keeper embracing the shank of the hook and both strands of the wire and the other one embracing the shank and the contiguous strands of wire.

7. In combination with a fish hook, of clamping jaws for clamping a frog or the like to the back of the hook, and a weight having means for closing and holding the jaws closed, said weight also serving as a keel to keep the frog right side up.

8. In combination with a fish hook, means at the rear of the hook for clamping a frog or the like thereto with the body of the frog above the point of the hook, and weed-guards at the rear and front of the hook.

9. In combination with a fish hook, clamping jaws each composed of a double strand of wire having a loop arranged at each side of the shank of the hook, adapted to embrace the body of a frog or the like.

In testimony whereof I have signed my name to this specification in the presence of two subscribing witnesses.

RALPH LEE SHEWARD.

Witnesses:
   CHAS. SWAINE,
   PERRY HILL.